United States Patent
Pekonen et al.

(10) Patent No.: US 7,660,583 B2
(45) Date of Patent: Feb. 9, 2010

(54) ADVANCED HANDOVER IN PHASED-SHIFTED AND TIME-SLICED NETWORKS

(75) Inventors: Harri Pekonen, Raisio (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 269 days.

(21) Appl. No.: 10/804,263

(22) Filed: Mar. 19, 2004

(65) Prior Publication Data
US 2005/0208942 A1 Sep. 22, 2005

(51) Int. Cl.
H04W 36/00 (2009.01)
H04W 4/00 (2009.01)

(52) U.S. Cl. .................. 455/436; 370/331
(58) Field of Classification Search .......... 455/436; 370/331, 333, 332, 328, 329, 346, 252, 478, 370/503
See application file for complete search history.

(56) References Cited

U.S. PATENT DOCUMENTS

| | | | |
|---|---|---|---|
| 4,449,248 A | 5/1984 | Leslie | |
| 4,601,586 A | 7/1986 | Bahr et al. | |
| 5,224,152 A | 6/1993 | Harte | |
| 5,307,376 A | 4/1994 | Castelain | |
| 5,359,607 A | 10/1994 | Nguyen et al. | |
| 5,371,734 A | 12/1994 | Fischer | |
| 5,513,246 A | 4/1996 | Jonsson | |
| 5,539,925 A | 7/1996 | Yli-Kotila | |
| 5,568,513 A | 10/1996 | Croft | |
| 5,613,235 A | 3/1997 | Kivari | |
| 5,657,313 A | 8/1997 | Takahashi | |
| 5,671,253 A | 9/1997 | Stewart | |
| 5,710,756 A | 1/1998 | Pasternak | |
| 5,732,068 A | 3/1998 | Takahashi | |

(Continued)

FOREIGN PATENT DOCUMENTS

DE 10164665 A1 8/2002

(Continued)

OTHER PUBLICATIONS

Apostolis K. Salkintzis et al. 'An In-Band Power-Saving Protocol for Mobile Data Networks' IEEE Transactions on Communications, vol. 46, No. 9, Sep. 1998, pp. 1194-1205.

(Continued)

Primary Examiner—George Eng
Assistant Examiner—Muthuswamy G Manoharan
(74) Attorney, Agent, or Firm—Banner & Witcoff Ltd.

(57) ABSTRACT

The present invention provides methods and apparatus for a wireless terminal to receive channel bursts in a wireless system while the wireless terminal is performing a handover from one base station to another base station. The wireless terminal determines that a handover may be necessary if a handover criterion is satisfied based upon a measurement of the signal quality associated with the current serving base station. If so, the wireless terminal performs measurements for the candidate cells, which are maintained in a candidate list. The wireless terminal will select one of the candidate cells (corresponding to the new serving base station) if the associated signal quality is sufficiently better than the current serving base station. After determining that a handover is necessary and before completing the handover to the new serving base station, the wireless terminal receives a last channel burst from the current serving base station.

27 Claims, 14 Drawing Sheets

U.S. PATENT DOCUMENTS

| | | | |
|---|---|---|---|
| 5,745,860 | A | 4/1998 | Kallin |
| 5,764,700 | A | 6/1998 | Makinen |
| 5,799,033 | A | 8/1998 | Baggen |
| 5,870,675 | A | 2/1999 | Tuutijarvi |
| 5,883,899 | A | 3/1999 | Dahlman |
| 5,886,995 | A | 3/1999 | Arsenault |
| 5,936,965 | A | 8/1999 | Doshi et al. |
| 5,959,995 | A | 9/1999 | Wicki |
| 5,995,845 | A | 11/1999 | Lardennois |
| 6,021,122 | A | 2/2000 | Tiedemann |
| 6,047,181 | A | 4/2000 | Suonvieri |
| 6,069,901 | A | 5/2000 | Hulyalkar |
| 6,088,412 | A | 7/2000 | Ott |
| 6,154,652 | A * | 11/2000 | Park et al. .......... 455/437 |
| 6,167,248 | A | 12/2000 | Hamalainen |
| 6,175,557 | B1 | 1/2001 | Diachina |
| 6,226,278 | B1 | 5/2001 | Bursztejn |
| 6,256,300 | B1 | 7/2001 | Ahmed |
| 6,256,357 | B1 | 7/2001 | Oshima |
| 6,262,982 | B1 | 7/2001 | Donahue |
| 6,262,990 | B1 | 7/2001 | Ejiri |
| 6,282,209 | B1 | 8/2001 | Kataoka |
| 6,285,686 | B1 | 9/2001 | Sharma |
| 6,295,450 | B1 | 9/2001 | Lyer |
| 6,320,855 | B1 | 11/2001 | Shi |
| 6,335,766 | B1 | 1/2002 | Twitchell |
| 6,339,713 | B1 | 1/2002 | Hansson |
| 6,356,555 | B1 | 3/2002 | Rakib |
| 6,366,568 | B1 * | 4/2002 | Bolgiano et al. .......... 370/320 |
| 6,385,264 | B1 | 5/2002 | Terasawa |
| 6,477,382 | B1 | 11/2002 | Mansfield |
| 6,490,727 | B1 | 12/2002 | Nazarathy |
| 6,549,592 | B1 | 4/2003 | Jones |
| 6,731,936 | B2 * | 5/2004 | Chen et al. .......... 455/437 |
| 7,065,359 | B2 * | 6/2006 | Chuah et al. .......... 455/436 |
| 2002/0010763 | A1 | 1/2002 | Salo |
| 2002/0025777 | A1 | 2/2002 | Kawamata |
| 2002/0093922 | A1 | 7/2002 | Grilli |
| 2002/0122465 | A1 | 9/2002 | Agee |
| 2003/0067943 | A1 | 4/2003 | Arsenault |
| 2003/0162535 | A1 * | 8/2003 | Nishiyama et al. .......... 455/422 |
| 2003/0162543 | A1 * | 8/2003 | Auranen et al. .......... 455/436 |
| 2005/0208942 | A1 * | 9/2005 | Pekonen et al. .......... 455/436 |
| 2007/0002798 | A1 * | 1/2007 | Leung .......... 370/331 |

FOREIGN PATENT DOCUMENTS

| | | |
|---|---|---|
| EP | 0577322 A1 | 1/1994 |
| JP | 2001-128204 A | 5/2001 |
| JP | 2004-48528 A | 9/2005 |
| WO | WO 00/36861 | 6/2000 |
| WO | WO 00/67449 | 11/2000 |
| WO | WO 01/31963 | 5/2001 |
| WO | WO 01/72076 | 9/2001 |
| WO | WO 02/01879 | 1/2002 |
| WO | WO 02/03728 | 1/2002 |
| WO | WO 02/03729 | 1/2002 |
| WO | WO-03073774 A1 | 9/2003 |
| WO | WO-2004023695 A2 | 3/2004 |

OTHER PUBLICATIONS

Apostolis K. Salkintzis et al. Performance Analysis of a Downlink Mac Protocol with Power-Saving Support, IEEE Transactions on Vehicular Technology, vol. 49, No. 3, May 2000, pp. 1029-1040.

Deering S., Host Extensions for IP Multicasting, Network Working Group, Aug. 1989, 1-16, Stanford, California.

Digital Video Broadcasting (DVB); DVB Specification for Data Broadcasting, European Telecommunications Standard Institute, May 2003, 1-58, ETSI EN 301 192 v1.3.1, France.

Digital Video Broadcasting (DVB); Specification for Service Information (SI) in DVB Systems, European Telecommunications Standard Institute, May 2003, 1-93, ETSI EN 300 468 v.1.5.1, France.

Draft Report of the 52nd Meeting of DVB GBS, EBU Headquarters, Geneva, Jun. 25-27, 2002. pp. 1-12.

European Search Report for European Patent Application No. 03255819.9-1525 dated Jan. 29, 2004.

Huang, Su and Chao, "Architectures and Handoff Schemes for CATV-Based Personal Communications Network", *Infocom '98, 17th Annual Joint Conference of the IEEE Computer and Communications Societies, IEEE* San Francisco, CA, Mar. 1998, pp. 748-755.

International Search Report for PCT/US03/00038 mailed Sep. 8, 2003.

Japanese Office Action from Patent Application No. 2007-503435, dated May 19, 2009, 4 pages.

* cited by examiner

ADVANCED HANDOVER IN PHASED-SHIFTED AND TIME-SLICED NETWORKS

FIELD OF THE INVENTION

This invention relates to burst transmission of audio data, video data, control data, or other information and, in particular, to apparatus and method for providing interrupt-free handover in a wireless terminal.

BACKGROUND OF THE INVENTION

Video streaming, data streaming, and broadband digital broadcast programming are increasing in popularity in wireless network applications, e.g., Internet protocol (IP) multicast services. To support these wireless applications, wireless broadcast systems transmit data content that support data services to many wireless terminals simultaneously. A wireless broadcast system typically comprises a plurality of base stations, in which data content is distributed by a service source through a backbone network. Wireless broadcast systems are typically unidirectional networks, in which there may not be an uplink channel (i.e. wireless terminal to serving base station) available. Thus, a wireless terminal may not be able to request lost data packets that are associated with a data service from the wireless broadcast system. When the wireless broadcast system has more than one base station serving different transmitting coverage areas (also known as cells), the base stations should transmit data services so that a wireless terminal is able to receive associated data packets in a seamless fashion as the wireless terminal moves from a coverage area of one base station to another coverage area of another base station. Seamlessness entails that the wireless terminal receive all data packets as the wireless terminal performs a handover from one base station to another. In order to complete a handover, a wireless terminal may need to measure neighboring cells to determine the new cell that will serve the wireless terminal after the handover. In addition, the wireless terminal must retune to match the transmission settings of the new cell. Moreover, in the prior art the wireless terminal typically must complete all of the necessary handover tasks before the base station serving the new cell transmits the next transmission burst. If the wireless terminal cannot expeditiously complete the tasks, the wireless terminal may miss the next transmission burst, causing a degradation of service.

What is needed is a system and method for providing an interrupt-free information and data flow to a wireless terminal receiving data and information from multiple wireless base stations.

BRIEF SUMMARY OF THE INVENTION

An aspect of the present invention provides methods and apparatuses for a wireless terminal to receive channel bursts in a wireless system while the wireless terminal is performing a handover from one base station to another base station, in which each base station serves a corresponding cell. A channel burst comprises at least one data packet and supports at least one data service. The wireless system comprises a plurality of base stations that interfaces to a backbone network in order to receive a plurality of data packets from a service source. The wireless terminal determines that a handover may be necessary if a handover criterion is satisfied based upon a measurement of the signal quality associated with the current serving base station. If so, the wireless terminal performs measurements for the candidate cells that are maintained in a candidate list. The wireless terminal selects one of the candidate cells (corresponding to the new serving base station) if the associated signal quality is sufficiently better than the current serving base station. After determining that a handover is necessary and before completing the handover to the new serving base station, the wireless terminal receives a last channel burst from the current serving base station.

With another aspect of the invention, channel bursts are formatted using a multi-protocol encapsulation in accordance with digital video broadcasting specifications. The encapsulation may conform to Internet Protocol (IP) standards.

With another aspect of the invention, the cells of the wireless system may be configured with associated phase shift offsets, in which a cell may transmit channel bursts at a different time than its neighboring cells. If a wireless terminal is cognizant of the phase shift offset of the selected cell associated with the handover, the wireless terminal may suspend processing between receiving the last channel burst from the current serving base station and receiving the first channel burst from the new serving base station.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
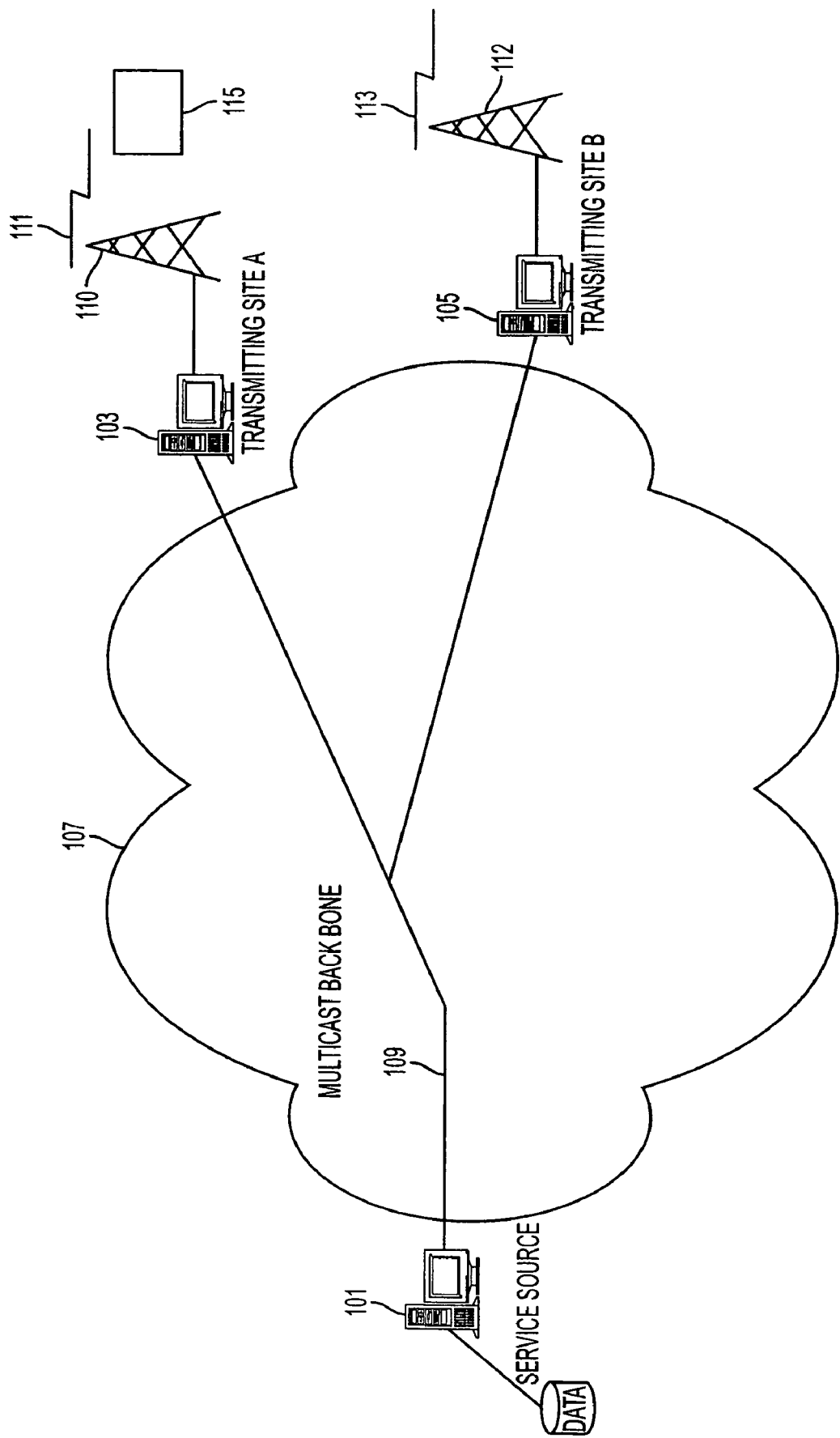
FIG. 1 shows schematically an example of a multicast backboned broadcast network that interconnects a service source to base stations in order to deliver data services in accordance with an embodiment of the invention.

FIG. 1 shows a multicast backboned broadcast network 107 that interconnects a service source 101 to base stations 103 and 105 to deliver data services to a wireless terminal 115 in accordance with an embodiment of the invention. Data packets, corresponding to a data service, are transmitted by base stations 103 and 105 to wireless terminal 115 through antennas 110 and 112 over radio channels 111 and 113, respectively. Even though wireless terminal 115 is processing only one of the radio channels (either channel 111 or 113), both base stations 103 and 105 broadcast the same data packets in which transmission may be offset relative to each other as will be discussed in the context of FIGS. 6 and 7.

Figure 2:
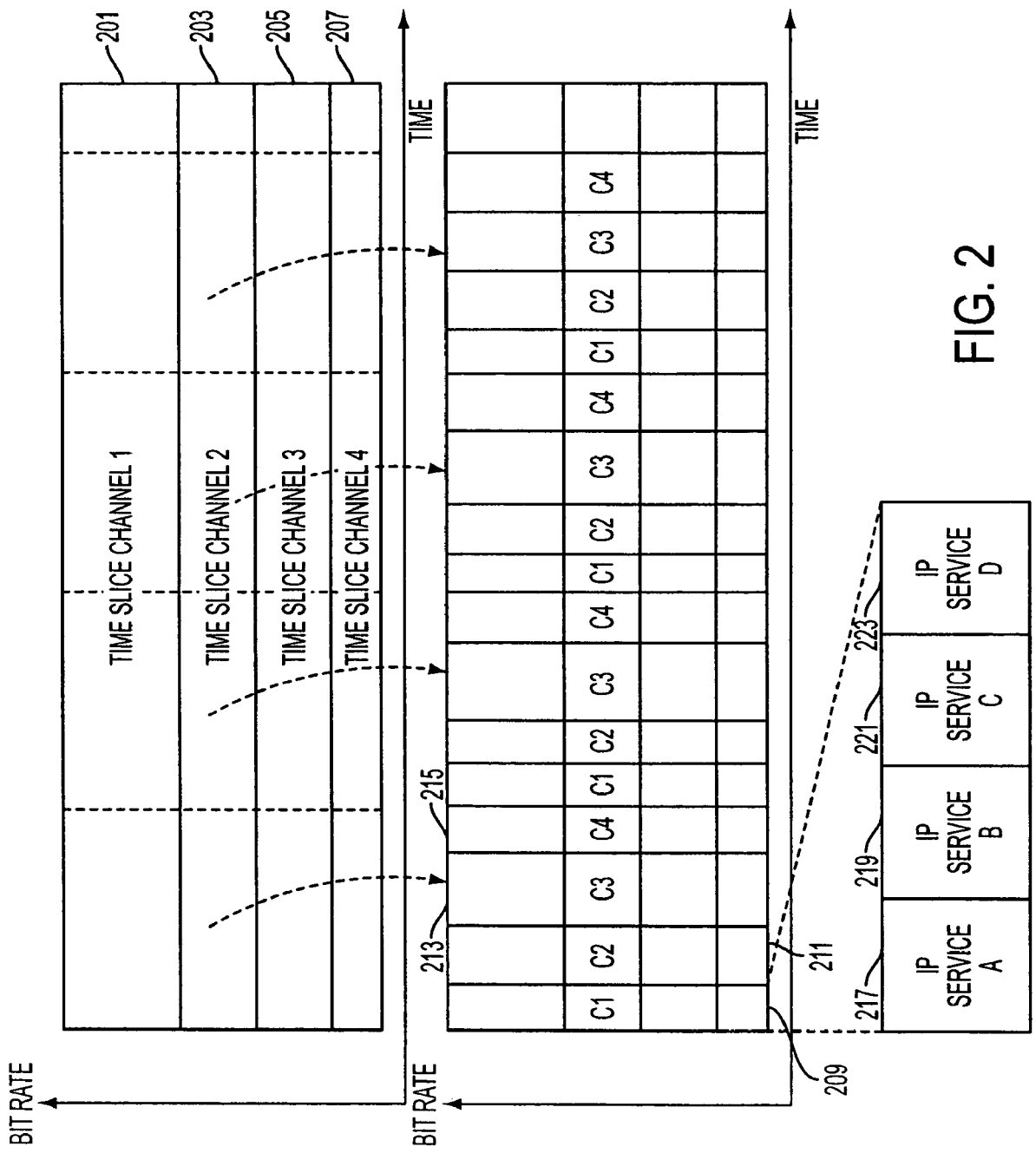
FIG. 2 shows transmission of Internet Protocol (IP) services utilizing time slice transmission in accordance with an embodiment of the invention.

FIG. 2 shows transmission of Internet Protocol (IP) services utilizing time slice transmission in accordance with an embodiment of the invention. A base station (e.g. base station 103) broadcasts data packets for a plurality of IP services using data streams 201, 203, 205, and 207. (Each data stream is allocated a portion of a data rate capacity.) In the embodiment, base station 103 may support functionality that is typically assumed by a base transceiver station (BTS), a base station controller (BSC), a combination of a BTS and a BSC, and a node B, which is a third Generation (3G) designation of a base transceiver station. Data transmission is essentially continuous such that data packets for an IP service are continuously being conveyed through a data stream.

In order to mitigate the loss of data packets, data streams 201, 203, 205, and 207 are mapped by base stations 103 and 105 into channel bursts 209, 211, 213, and 215, respectively, in which channel bursts are transmitted over radio channels 111 and 113 rather than data streams 201, 203, 205, and 207. Each data stream (201, 203, 205, and 207), and consequently each channel burst (209, 211, 213, and 215), supports at least one data service. Thus, each channel burst may support a plurality of data services (e.g. a group of related data services).

Data rates associated with channel bursts 209, 211, 213, and 215 are typically greater than data rates that are associated with data streams 201, 203, 205, and 207 so that a corresponding number of data packets can be sent in a shorter amount of time. In the embodiment, data streams 201, 203, 205, and 207 correspond to continuous data rates of approximately 100 Kbit/sec. Channel bursts 209, 211, 213, and 215 correspond to approximately 4 Mbit/sec with an approximate one second duration. However, other embodiments may use different data rates for data streams 201-207 and for channel bursts 209-215.

Wireless terminal 115 may be required to transfer to another base station (e.g. base station 105) while data packets are being transmitted. Because a certain amount of time is required for wireless terminal 115 to complete the handover process (e.g. tuning to a new center frequency), wireless terminal 115 may miss some of the data packets if channel bursts 209, 211, 213, and 215 were transmitted to wireless terminal 115 during the handover, causing a gap in reception. Depending upon the type of data service, a user of wireless terminal 115 may perceive the loss of data packets.

In the embodiment, the entire data rate capacity is allocated to a channel burst at a given time. As shown in FIG. 2, channel bursts 209, 211, 213, and 215 are interleaved in time. An idle time duration (during which data packets are not transmitted for the data service) occurs between consecutive transmissions of a channel burst (e.g. channel burst 209). A wireless broadcast system can utilize the idle time duration during which wireless terminal 115 can be instructed to transfer to another base station to complete a handover. The other base station (e.g. base station 105) may transmit the same data as the base station (e.g. base station 101) previously serving wireless terminal 115 using a different center frequency and a different amount of phase shift offset.

Channel bursts are typically transmitted periodically by a base station. For example, a subsequent channel burst may occur T seconds after channel burst 209, in which a channel burst is transmitted every T seconds. Wireless terminal 115 may maintain precise timing, as with the Global Positioning System (GPS), to determine an absolute time at which each channel burst occurs. In another embodiment, wireless terminal 115 is provided information about a time period in each channel burst, informing wireless terminal 115 about the subsequent channel burst. The time period may be included in an IP packet, a multiprotocol encapsulated frame, any other packet frame, and a third generation (3G) or General Packet Radio Service (GPRS) channel or modulation data, such as transmitter parameter signaling. Alternatively, wireless terminal 115 may detect an occurrence of a channel burst by receiving a signal preamble, which may be a data sequence that is known as a priority to wireless terminal 115. In another embodiment, wireless terminal 115 may receive an overhead message on an overhead channel from a base station. The overhead message may contain timing information regarding the occurrence of channel bursts. For example, in an embodiment of the invention the associated phase shift offsets that are associated with the base stations may be included in the overhead message. (Phase shift offset information may be included in a Service Information (SI) table, e.g., a Network Information Table (NIT) table for a DVB-T system.) The overhead channel may be logically or physically distinct from the downlink radio channel that supports the transmission of channel bursts.

Channel bursts 209, 211, 213, and 215 may be formatted by using a multi-protocol encapsulation in accordance with Section 7 of European Standard EN 301197 "Digital Video Broadcasting (DVB), DVB specification for data broadcasting." The encapsulation may conform to Internet Protocol (IP) standards.

Figure 3:
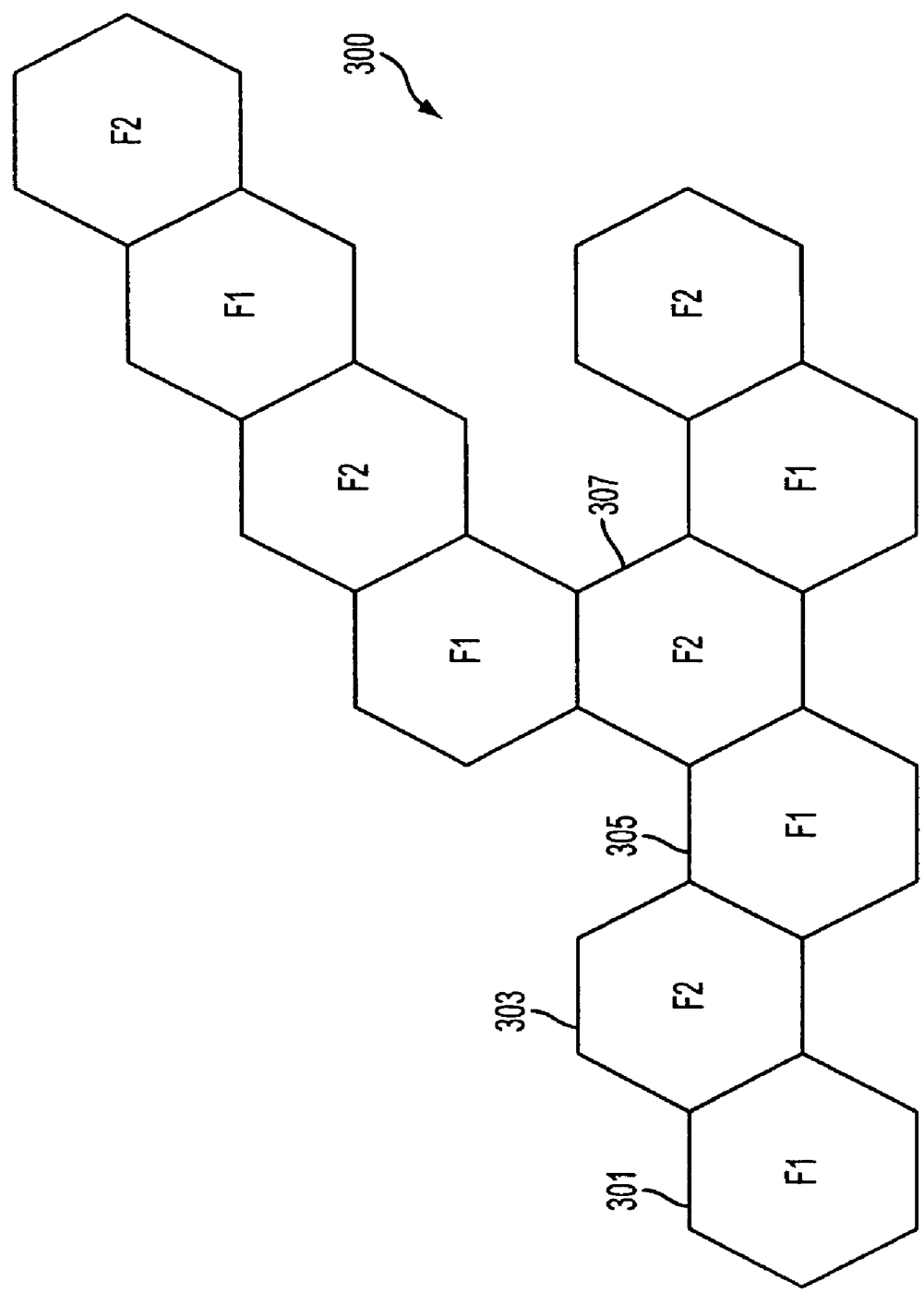
FIG. 3 shows schematically and simplified a wireless system with two transmission center frequency values in accordance with an embodiment of the invention.

FIG. 3 shows a wireless system 300 with two transmission center frequency designations in accordance with an embodiment of the invention. A base station corresponding to a cell (e.g. cells 301, 303, 305, and 307) is assigned one of two different center frequency values F1 and F2. (A center frequency value corresponds to a center frequency of a frequency spectrum that is utilized by a base station.) Assigning different center frequency values to adjacent cells reduces interference from non-serving cells on wireless terminal 115. For example, when wireless terminal 115 traverses from cell 301 (corresponding to base station 103) to cell 303 (corresponding to base station 105), wireless terminal 115 retunes from center frequency value F1 to center frequency value F2. While wireless terminal 115 is being served within cell 301 or cell 303, wireless terminal 115 receives data packets contained in channel bursts that are transmitted by base station 103 or base station 105, respectively. With a configuration of only two center frequency values, as shown in FIG. 3, a topological configuration of the wireless system is restricted to "row-like" configurations.

Figure 4:
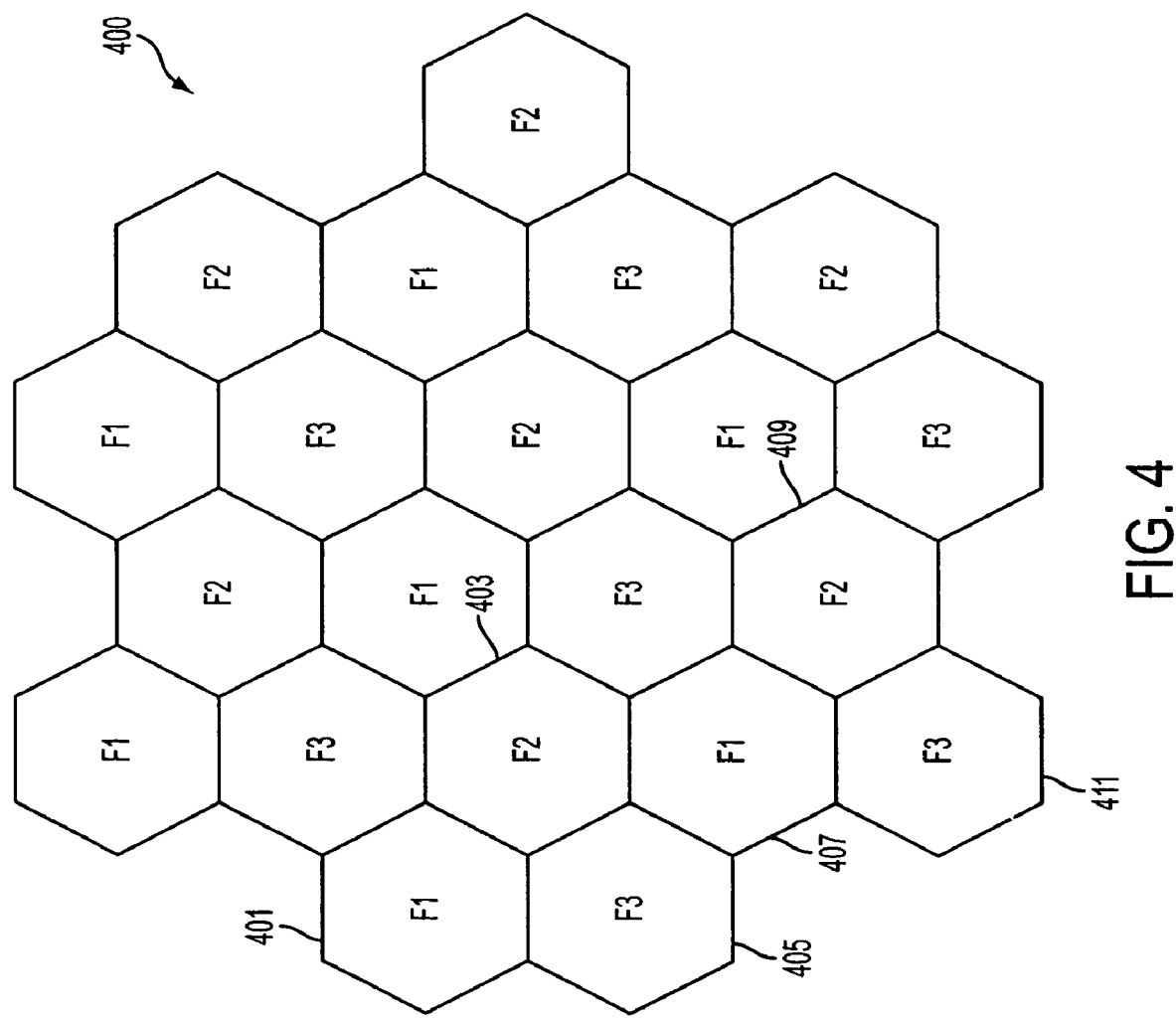
FIG. 4 shows schematically and simplified a wireless system with three transmission center frequency values in accordance with an embodiment of the invention.

FIG. 4 shows a wireless system 400 with three transmission center frequency values in accordance with an embodiment of the invention. A base station corresponding to a cell (e.g. cells 401, 403, 405, 407, 409, or 411) is assigned one of three different center frequency values F1, F2, and F3. Wireless terminal 115 receives data packets through channel bursts that are transmitted by a base station corresponding to a cell in which wireless terminal 115 is located. With three center frequency values, a wireless system can assume a more complicated topological configuration than if only two center frequency values were assigned. However, as the number of center frequency values that are assigned to the wireless system increases, a required frequency spectrum for a wireless system increases.

Transmission configurations of wireless systems 300 and 400 are typically asymmetric in that a data rate from wireless system 300 or 400 to wireless terminal 115 (downlink or forward radio channel) is typically greater than a data rate from wireless terminal 115 to wireless system 300 or 400 (uplink or reverse radio channel).

As will be discussed in the context of FIGS. 11 and 12, wireless system 300 or 400 may receive measured signal characteristics (e.g., signal strength, packet error rate, and bit error rate) from wireless terminal 115 over the uplink radio channel. Using the signal characteristics, wireless system 300 or 400 may instruct wireless terminal 115 to perform a handover from one base station to another base station as wireless terminal 115 traverses the corresponding cells. In other embodiments, wireless terminal 115 may perform a handover in accordance with the measured signal characteristics without being instructed by wireless system 300 or 400. In some embodiments, wireless system 300 or 400 may not support the uplink channel so that wireless terminal 115 does not send messaging to wireless system 300 or 400.

In the embodiments shown in FIGS. 3 and 4, cells (e.g. 301-307 and 401-411) are assigned center frequency values from a set of center frequency values that are associated with wireless system 300 and 400. Assigning different center frequency values to adjacent cells enables wireless terminal 115 to distinguish a signal transmitted from the base station (e.g. 103 or 105), corresponding to the cell in which wireless terminal 115 is located, from signals transmitted from other base stations. (Such an assignment approach is referred to as frequency division multiple access (FDMA).) However, other embodiments may provide orthogonal separation by alternative approaches such as channelization codes (e.g. Walsh codes) that are utilized with spread spectrum techniques (e.g. code division multiple access (CDMA)). In such a case, a wideband signal is centered about a single frequency that is assigned to all the cells of a wireless system, in which each corresponding base station uses the same frequency spectrum. Adjacent cells are assigned different channelization codes in order to reduce interference from non-serving base stations upon wireless terminal 115. Wireless terminal 115 may process a received signal with an appropriate channelization code that is assigned to the serving base station.

Figure 5:
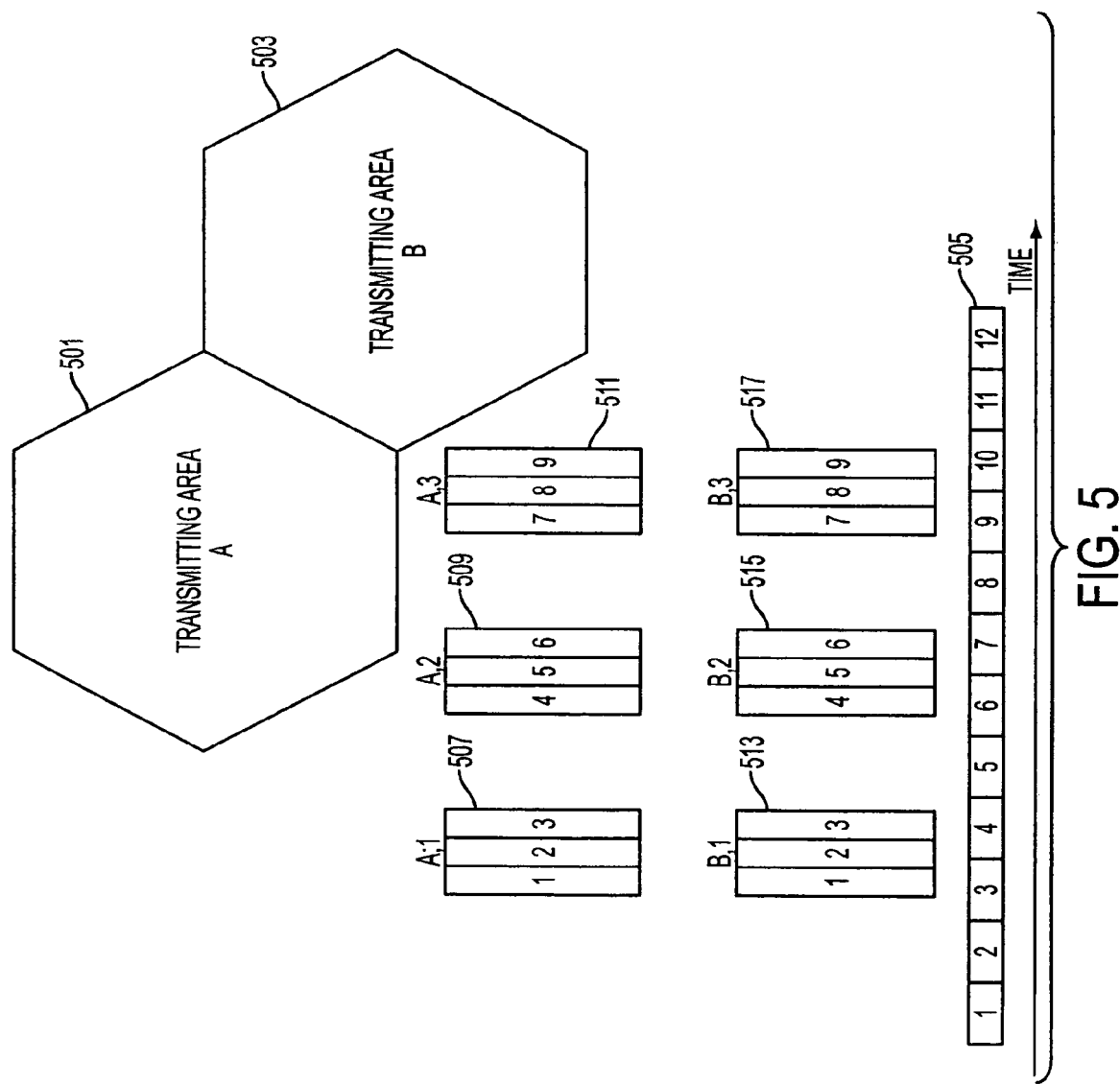
FIG. 5 shows a wireless system that utilizes time slice transmission in an ideal scenario in accordance with an embodiment of the invention.

FIG. 5 shows a wireless system that utilizes time slice transmission in an ideal scenario in accordance with an embodiment of the invention. Channel bursts from cell 501 are synchronized with channel bursts from cell 503 (e.g. channel burst 507 occurs at essentially the same time as channel burst 513 and channel burst 509 occurs at essentially the same time as channel burst 515). The corresponding base stations that serve cells 501 and 503 are provided packet stream 505 through backbone network 107 such that packet delivery is synchronous. (In this embodiment, the amount of phase delay that is associated with the transmission of channel bursts from each base station is zero since channel bursts from all base stations occur at the same time.) In this scenario, as shown in FIG. 5, wireless terminal 115 will receive all packets if wireless terminal 115 is handed over from cell 501 to 503. For example, if wireless terminal 115 receives channel burst 507 and channel burst 515 (as result of a handover from cell 501 to cell 503), wireless terminal 115 receives packet numbers 1, 2, 3, 4, 5, and 6.

Figure 6:
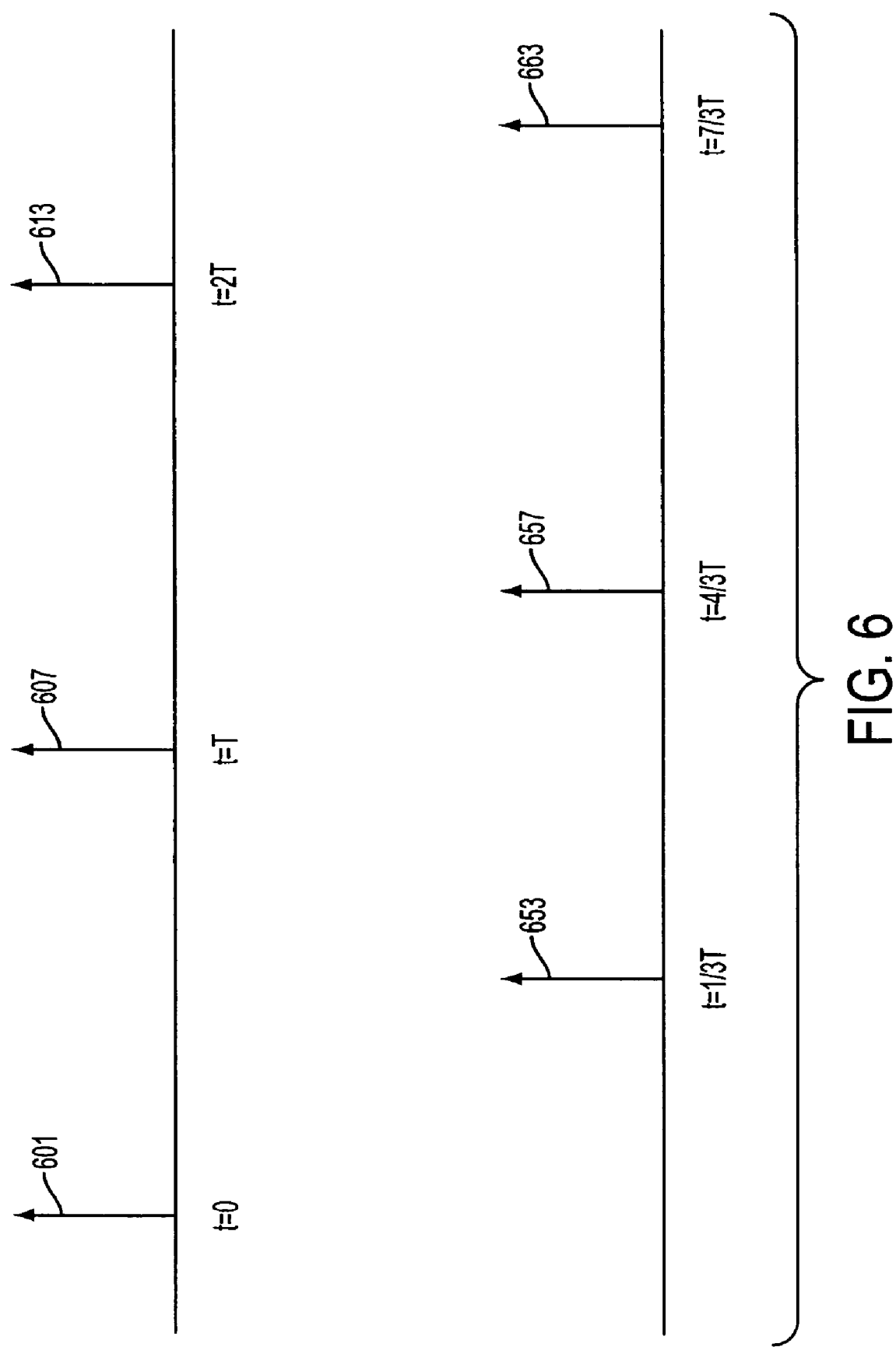
FIG. 6 shows a timing diagram showing channel bursts from a plurality of base stations in accordance with an embodiment of the invention.

FIG. 6 shows a timing diagram showing channel bursts from base stations 103 and 105 for wireless system 400 that is shown in FIG. 4 (corresponding to three center frequency values) in accordance with an embodiment of the invention (In other embodiments of the invention, center frequency value F3, as shown in FIG. 4, may be different in different cells but correspond to the same phase shift offset.) Each channel burst may support a group of data services. Each group of data services comprises at least one data service. Events 601-613 designate times in which base station 103 (that is serving wireless terminal 115 when located in cell 401) initiates channel bursts (e.g. channel burst 209). Base station 103 transmits a channel burst periodically, every T seconds. (A time interval of T seconds corresponds to 360 degrees.) Events 653-663 designate times in which base station 105 (that is serving wireless terminal 115 when located in cell 403) initiates channel bursts. Base station 105 transmits channel bursts periodically, every T seconds. However, events 653-663 are offset by ⅓T seconds (corresponding to 120 degrees). With cell 405 (not represented in FIG. 6), the associated amount of phase shift offset is 240 degrees (corresponding to a time offset of ⅔T with respect to cell 401). In general, an amount of phase shift offset (in degrees) that is associated with a cell has the form (360/N)*i, where N is the number of center frequency values in a wireless system and i is an integer. Also, a time duration of a channel burst should not exceed T/3 seconds, otherwise channel bursts between adjacent cells may overlap, possibly causing wireless terminal 115 to lose packet when a handover occurs.

Figure 7:
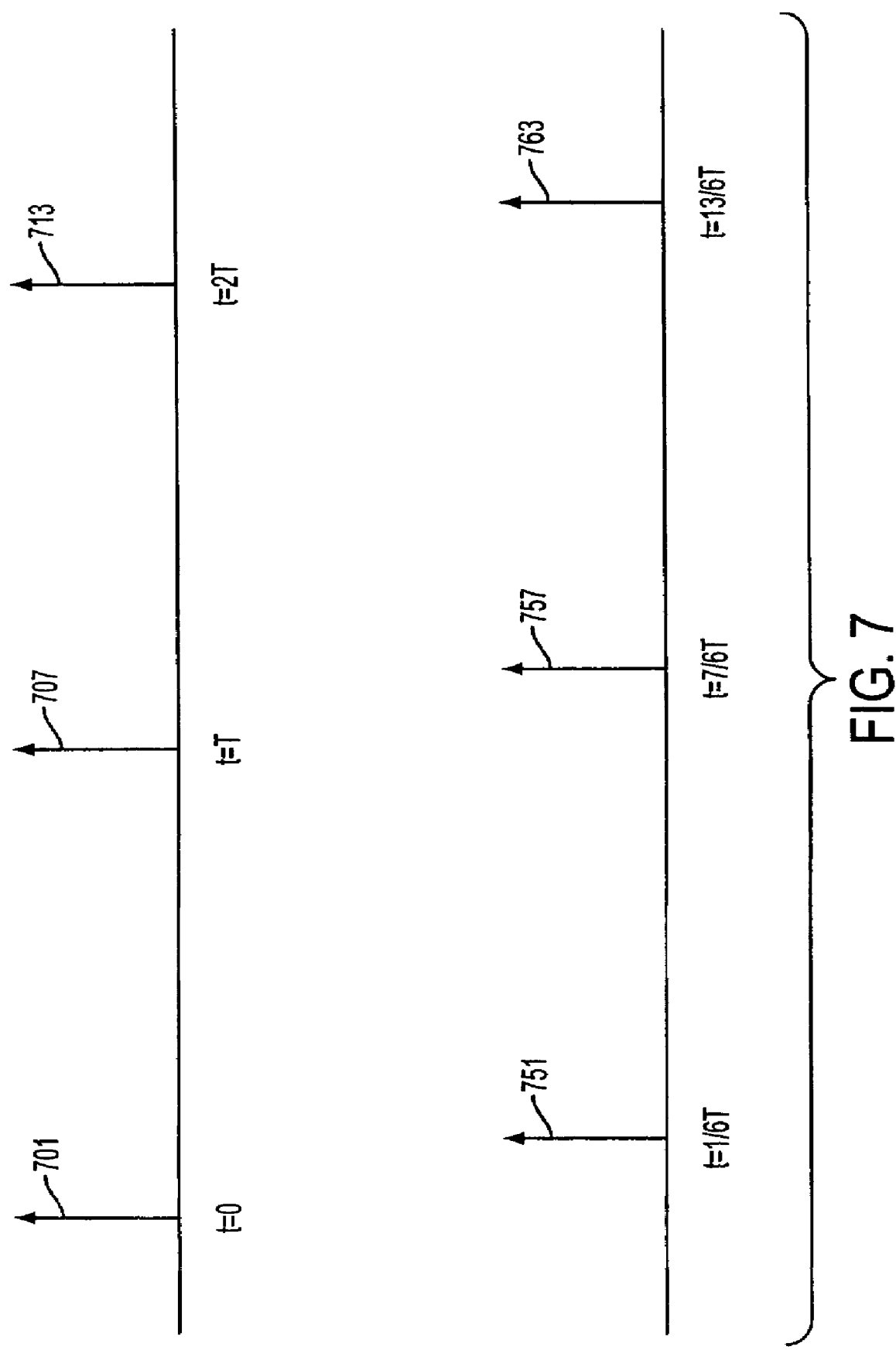
FIG. 7 shows a timing diagram showing channel bursts from a base station for a plurality of data services in accordance with an embodiment of the invention.

FIG. 7 shows a timing diagram showing channels bursts from a base station 103 for a plurality of data services for wireless system 400 that is shown in FIG. 4 in accordance with an embodiment of the invention. Each channel burst may support a group of data services. Each group of data services comprises at least one data service. With the embodiment, base station 401 supports a second group of data services by interlacing channel bursts between channel bursts that support the first group of data services. In FIG. 7, base station 401 supports the first group of data services with channel bursts 701-713 and the second group of data services with channel bursts 751-763. However channel bursts 751-763 are offset by ⅙T seconds (corresponding to 60 degrees) with respect to channel bursts 701-713. In such a case, a time duration of a channel burst should not exceed T/6 seconds, otherwise channel bursts may overlap, possibly causing wireless terminal 115 to lose data packets if being served by a plurality of data services or if a handover occurs.

Table 1 summarizes the discussion of phase shift offset allocations for a wireless system as shown in FIG. 4. Service group X and service group Y are each associated with at least one data service. Although the embodiment, as shown in FIGS. 6-7, utilizes a uniform distribution for associating an amount of phase shift offset with a channel burst, the amount of phase shift offset may be adjusted in cases in which a time duration of a channel burst may be dependent upon the associated data services. Some data services may require more data bandwidth and consequently require a greater time duration to broadcast the associated data than with other data services.

TABLE 1

TIME OFFSET OF TIME SLICE TRANSMISSION

|  | Service Group X | Service Group Y |
|---|---|---|
| Base Station A | NT (0 degrees) | (N + 1/6)T (60 degrees) |
| Base Station B | (N + 1/3)T (120 degrees) | (N + 1/2)T (180 degrees) |
| Base Station C | (N + 2/3)T (240 degrees) | (N + 5/6)T (300 degrees) |

A serving base station (e.g. base station 103 or 105) may transmit phase shift offset information about itself as well as about base stations serving neighboring cells by inserting the information in a channel burst. Additionally, timing information about subsequent channel bursts may be included. In another embodiment, a serving base station may send phase shift offset information on a separate overhead channel, which may be logically or physically distinct from the downlink channel that contains channel bursts. In another embodiment, wireless terminal 115 may maintain a look-up table that maps amounts of phase shift offset with different base stations. In such a case, when wireless terminal 115 wishes to receive a signal from a base station, wireless terminal 115 accesses the table in order to determine the associated amount of phase shift offset.

Figure 8:
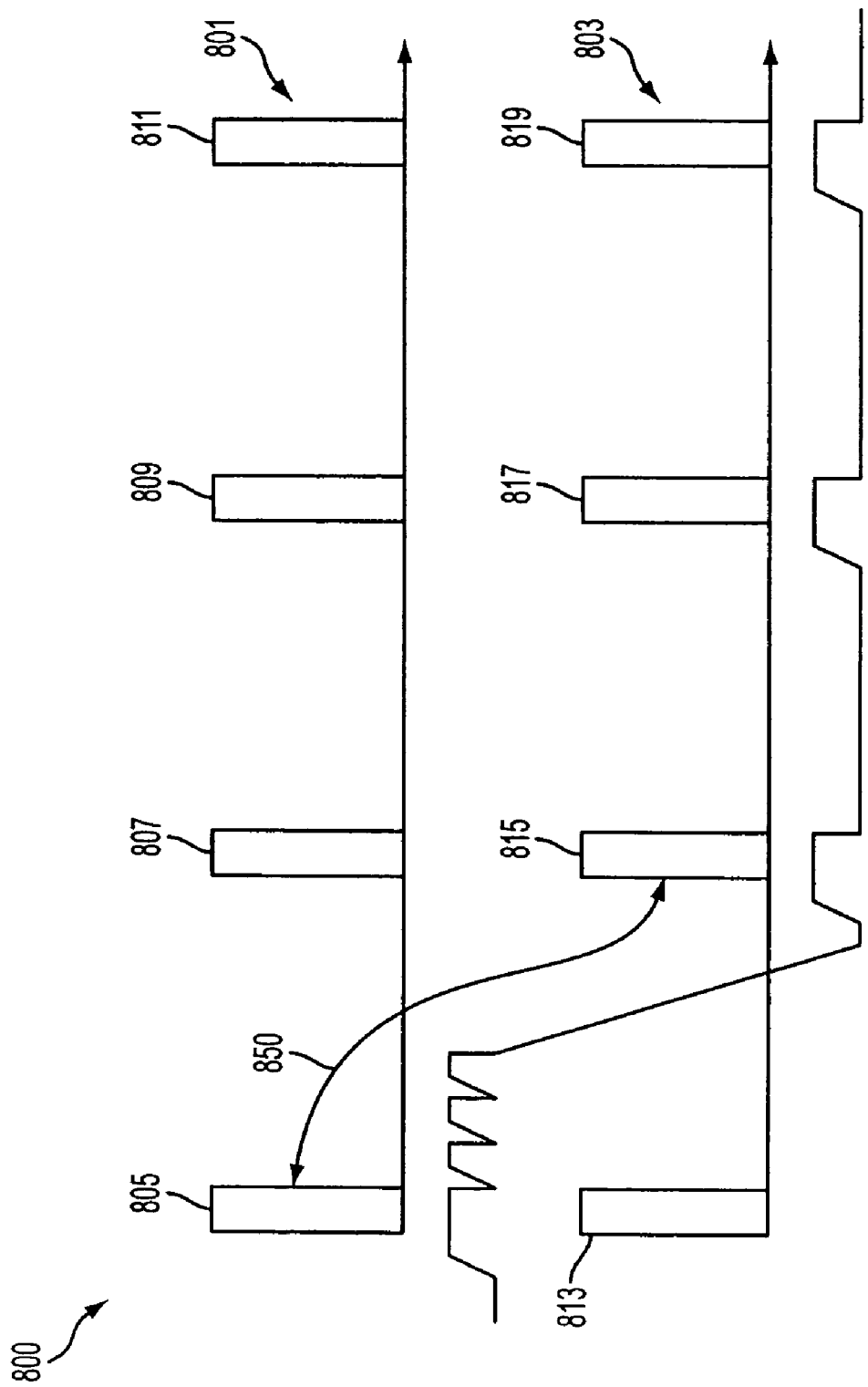
FIG. 8 shows a timing diagram of a handover, in which channel bursts are synchronized between base stations in accordance with the prior art.

FIG. 8 shows a timing diagram 800 of a handover, in which channel bursts are synchronized between base stations in accordance with the prior art. Sequence 801 (comprising channel bursts 805-811) is transmitted by a serving base station before a handover and sequence 803 (comprising channel bursts 813-819) is transmitted by a new serving base station after the handover. Sequence 801 and sequence 803 are synchronized in which channel bursts are transmitted essentially at the same time by the serving base station and the new serving base station. Before the handover, a wireless terminal receives channel burst 805 (corresponding to the desired data service). During time interval 850, the wireless terminal determines whether to perform the handover by determining the associated signal qualities of neighboring cells. If the wireless terminal determines to perform the handover, the wireless terminal performs the handover (e.g., tuning to a new frequency or code division sequence) during time interval 850. After the handover, the wireless terminal receives sequence 803, starting with channel burst 815 that is transmitted by the new serving base station. However, if the wireless terminal does not complete the handover before channel burst 815 is transmitted, the wireless terminal will miss the next channel burst for the service, possibly causing degradation of the service. If the wireless terminal determines not to perform a handover, the wireless terminal continues to receive sequence 801.

Figure 9:
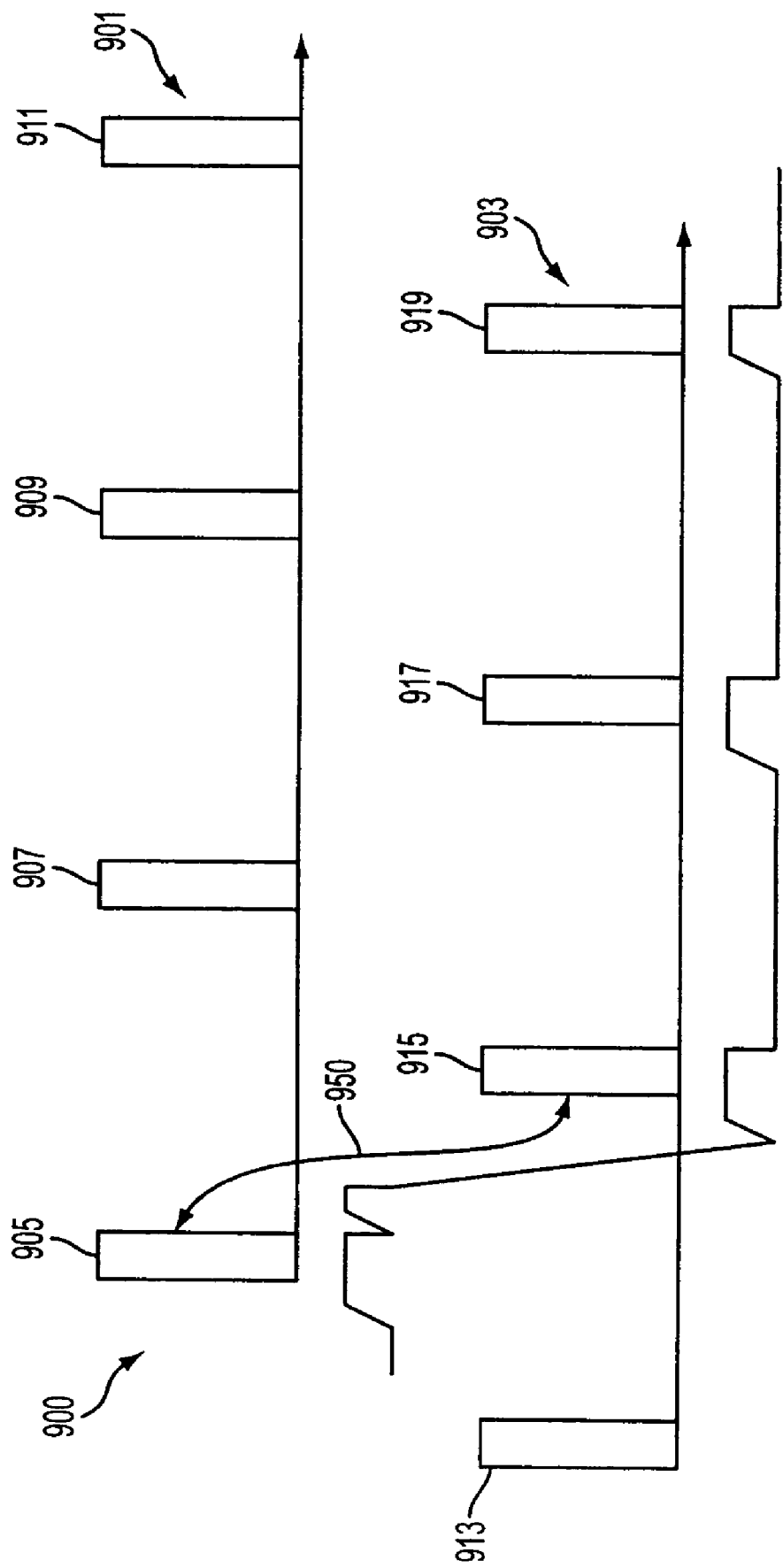
FIG. 9 shows a timing diagram of a handover, in which channel bursts are synchronized with a phase shift offset in accordance with the prior art.

FIG. 9 shows a timing diagram 900 of a handover, in which channel bursts are synchronized with a phase shift offset in accordance with the prior art. In the embodiment, timing diagram 900 corresponds to the timing diagram in FIG. 6, in which sequence 901 is offset from sequence 903 by 180 degrees. Sequence 901 (comprising channel bursts 905-911) is transmitted by a serving base station before a handover and sequence 903 (comprising channel bursts 913-919) is transmitted by a new serving base station after the handover. Sequence 901 and sequence 903 are offset in which channel bursts of sequence 903 are transmitted essentially at a time that is halfway between the channel bursts of sequence 901.

Before the handover, a wireless terminal receives channel burst 905 (corresponding to the desired data service). The wireless terminal determines whether to perform the handover by determining the associated signal qualities of neighboring cells during time interval 950. If the wireless terminal determines to perform the handover, the wireless terminal performs the handover (e.g., tuning to a new frequency or code division sequence) during time interval 950. (Typically, time interval 950 is smaller than time interval 850 resulting from the phase shift offset between cells.) After the handover, the wireless terminal receives sequence 903, starting with channel burst 915 that is transmitted by the new serving base station. However, if the wireless terminal does not complete the handover before channel burst 915 is transmitted, the wireless terminal will miss the next channel burst for the service, possibly causing degradation of the service. If the wireless terminal determines not to perform a handover, the wireless terminal continues to receive sequence 901.

Figure 10:
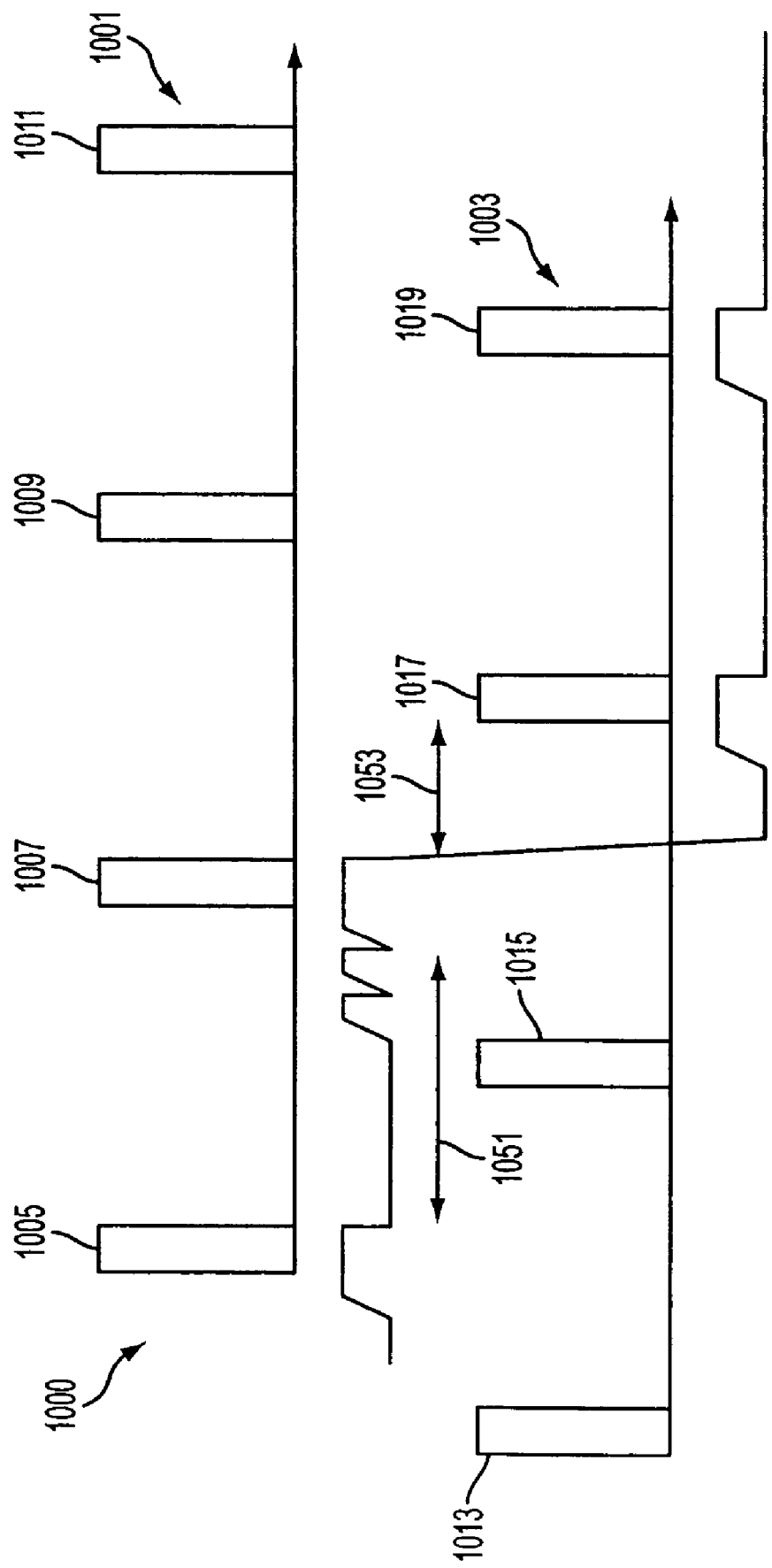
FIG. 10 shows a timing diagram of a handover in accordance with an embodiment of the invention.

FIG. 10 shows a timing diagram 1000 of a handover in accordance with an embodiment of the invention. With the embodiment shown in FIG. 10, sequence 1001 is offset from sequence 1003 by 180 degrees. However, the invention supports other embodiments in which the phase shift offset is different from 180 degrees and in which there may be no phase shift offset. Sequence 1001 (comprising channel bursts 1005-1011) is transmitted by a serving cell before a handover and sequence 1003 (comprising channel bursts 1013-1019) is transmitted by a new serving cell after the handover. Sequence 1001 and sequence 1003 are offset in which channel bursts of sequence 1003 are transmitted essentially at a time that is halfway between the channel bursts of sequence 1001. Before the handover, a wireless terminal receives channel burst 1005 (corresponding to the desired data service). The wireless terminal measures the signal quality associated with channel burst 1005 and determines if a handover is warranted by using a handover criterion. As will be discussed in greater detail with FIGS. 11 and 12, the wireless terminal determines whether to perform the handover by determining the associated signal qualities of neighboring cells during time interval 1051. If the wireless terminal determines to perform the handover, the wireless terminal waits to receive channel burst 1007. The wireless terminal then performs the handover during time interval 1053. After the handover, the wireless terminal receives sequence 1003, starting with channel burst 1017 that is transmitted by the new serving base station. If the wireless terminal determines not to perform a handover, the wireless terminal continues to receive sequence 1001.

In the embodiment, if the wireless terminal has not completed measuring the signal quality of all the neighboring cells that are contained on a candidate list (not shown in FIG. 10) during time interval 1051, the wireless terminal can suspend making the measurements in order to receive channel burst 1007. The wireless terminal can then complete making the measurements to determine the new serving cell site. In such a case, the wireless terminal would wait until receiving channel burst 1009 before performing the handover.

Figure 11:
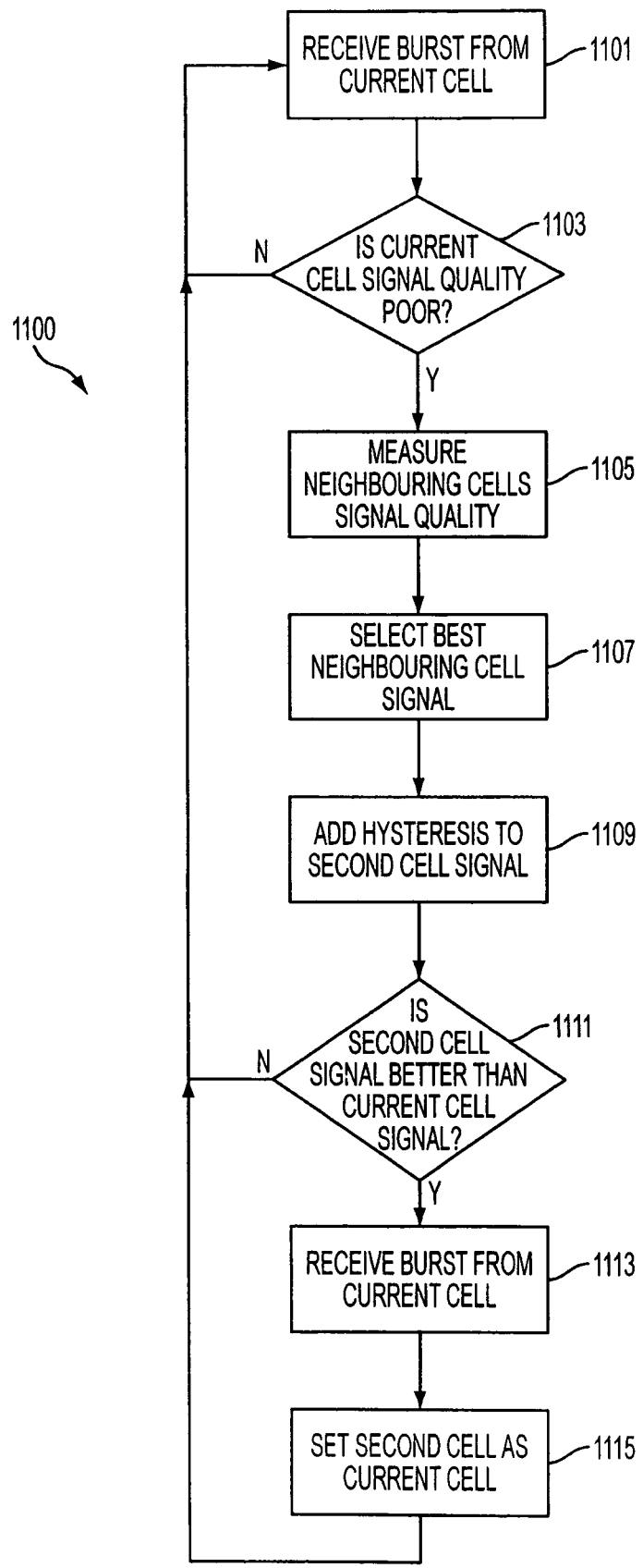
FIG. 11 shows a flow diagram for a wireless terminal that supports a handover in accordance with an embodiment of the invention.

FIG. 11 shows a flow diagram 1100 for a wireless terminal that supports a handover in accordance with an embodiment of the invention. In step 1101, wireless terminal 115 receives a channel burst from serving base station 103 (corresponding to cell 403). In step 1103, wireless terminal 115 determines if the signal quality is sufficiently poor to warrant a handover to another cell that can provide better signal quality. If not, wireless terminal 115 continues to receive channel bursts from base station 103.

If a handover may be warranted, as determined by step 1103, wireless terminal measures the signal qualities of neighbor cells in step 1105 and selects a candidate cell having the best signal quality in step 1107. In step 1109, wireless terminal 115 adjusts the measured signal quality of the candidate cell by adding a hysteresis value in order to reduce the number of handovers. Step 1111 determines whether wireless terminal 115 shall perform a handover to the selected candidate cell. If not, wireless terminal 115 continues to receive channel bursts from base station 103. If a handover is warranted in step 1111, wireless terminal 115 receives a last channel burst from base station 103 in step 1113 and tunes to the new frequency that is associated with the selected candidate cell (e.g., cell 403 or 405) in step 1115.

Figure 12:
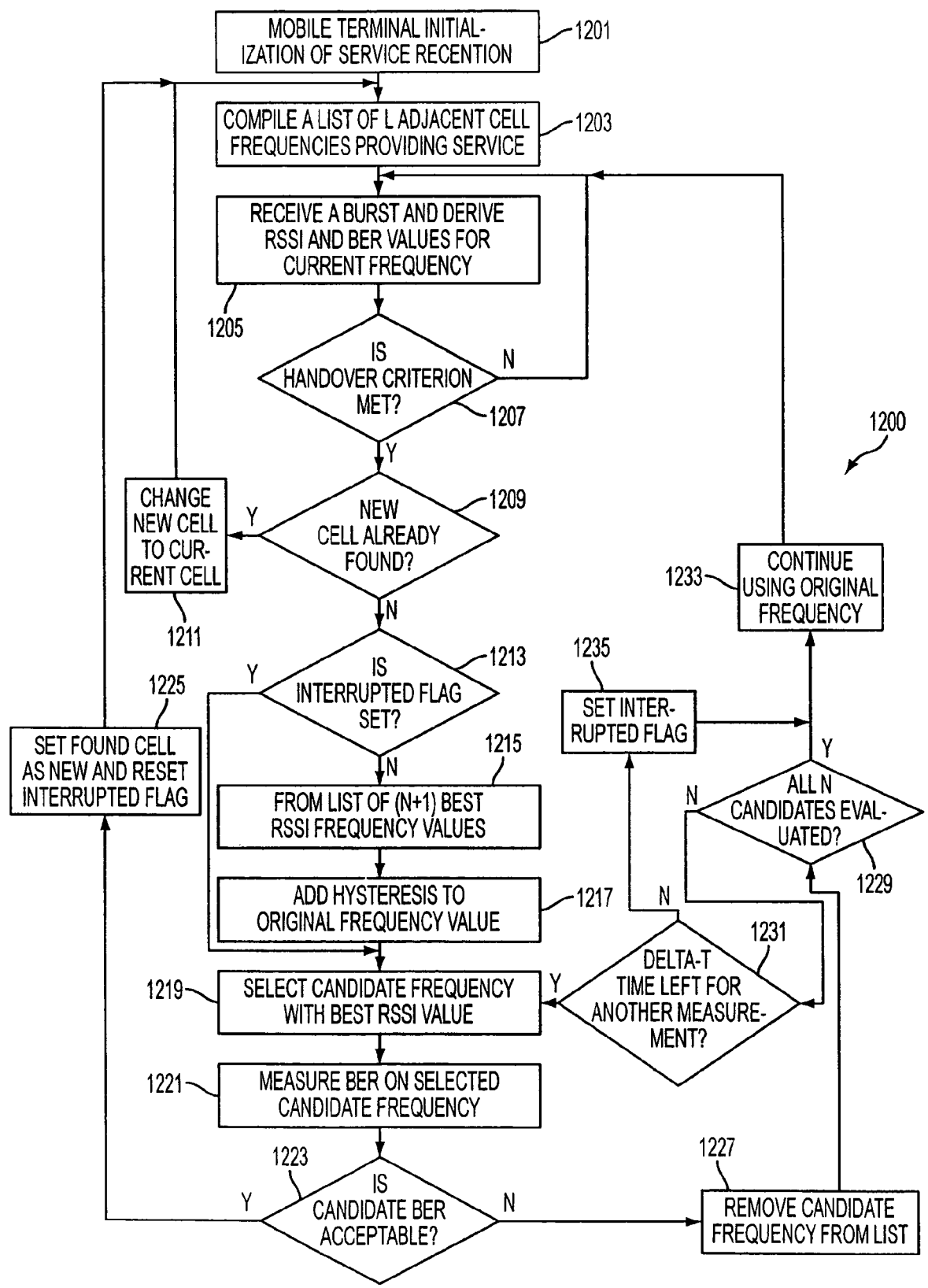
FIG. 12 shows a flow diagram of a handover in accordance with the flow diagram in FIG. 11.

FIG. 12 shows flow diagram 1200 for wireless terminal 115 for determining if a handover is required in accordance with flow diagram 1100. After the initialization of the wireless terminal 115, at step 1201, the wireless terminal 115 compiles a list of 'L' alternative center frequency values for L cells (e.g. cells 403 and 405 as shown in FIG. 4) adjacent to the cell (e.g. cell 401 in FIG. 4) that are providing the desired data service at step 1203. (For example, adjacent cell information may be determined with the TPS bit cell_id information and NIT SI table cell_id information.) In the example provided, this list would include the broadcasting frequencies for cells 403 and 405. The alternative center frequency values may be provided in the channel bursts that are broadcast by the base station (e.g., base station 103) that is serving cell 401. (In an embodiment of the invention that supports DVB-H, the transmitter is transmitting data continuously. In the embodiment, time slicing bursts may be considered as logical bursts that are separated from each other by a PID value. Bursts are defined so that one can insure that there is no data for a particular elementary stream during "off" periods. Bursts are transmitted during "on" periods, but the exact transmitting time is not defined in the embodiment.) For example, channel burst 209 may include a list of center frequency values of adjacent cells that provide the same data service. Additionally, as previously discussed, phase shift offset information may be included. (In the case that a data service is not provided in a neighboring cell, wireless terminal 115 may be instructed to continue being served by the cell that is providing the data service. In other embodiments, wireless terminal 115 may request that the service be moved to some of the adjacent cells. In such a case, the network decides whether to move the requested service.)

Signal data of serving base station 103 are derived in the wireless terminal 115, at step 1205. These data include a received signal strength indicator (RSSI) value, a packet error rate (PER), and a bit-error rate (BER) value for the signal frequency, here designated as the original center frequency, used by the base station 103 in the wireless cell 401. A handover is considered or initiated if a pre-determined handover criterion has been met. In one embodiment, the handover criterion is met if the original frequency BER exceeds a predetermined limit or, alternatively, if the original frequency RSSI falls below a predefined value. (Other embodiments of the invention may use another criterion (that may be measured or derived) for determining whether a handover should be performed.) If the handover criterion is not met, as determined by decision block 1207, the wireless terminal 115 continues to monitor the original frequency RSSI and BER values for adverse change.

If the handover criterion has been met (as determined by step 1207) and if a new cell has already been determined by step 1209, then wireless terminal 115 tunes to the new cell in order to complete the handover in step 1211.

On the other hand, if the handover criterion has been met and if a new cell has not been determined, then step 1213 determines if an interrupt flag has been set in step 1235. If the interrupt flag has not been set, wireless terminal 115 measures or determines the RSSI values for the 'L' adjacent cell transmission signals providing the same service in step 1215. The 'L' RSSI values for the adjacent cell transmission signals can be readings obtained after the handover criterion is met, or the RSSI values can be values which have been obtained and averaged over a selected period of time and retained in wireless terminal 115. Selection of a candidate signal frequency for handover is a function of the RSSI values obtained for the 'L' adjacent cell transmission signal frequencies.

The 'N' adjacent cell frequencies having the strongest RSSI values are designated as 'N' candidate frequencies, where N<=L. In a preferred embodiment, 3<=N<=5. A list of (N+1) RSSI frequency values is formed including the 'N' candidate frequencies and the original frequency, at step 1215. In an alternative embodiment, the RSSI value for the original frequency is increased by a predetermined hysteresis value, for example 5 dB, to decrease the likelihood of frequent or unnecessary handovers from the original frequency to a candidate frequency, at optional step 1217. The candidate frequency having the greatest RSSI value is selected from the list, at step 1219, and the BER value is measured for this current candidate frequency, at step 1221.

If the current candidate frequency BER value is not acceptable, as determined by decision block 1223, the current candidate frequency is removed from the list, at step 1227. If additional candidate frequencies remain in the list as determined by decision block 1229 and if step 1231 determines that sufficient time remains before the next channel burst from serving base station 103, the next candidate frequency value having the greatest RSSI value is designated as the current candidate frequency, at step 1219. The process proceeds to step 1221 as above. (It is possible that the cell corresponding to the largest RSSI does not correspond to the cell with the lowest BER or PER because of fading, noise, or interference.) If no candidate frequency values remain in the list, at decision block 1229, the wireless terminal 115 continues to use the original frequency in receiving information, at step 1233, and operation continues to step 1205. If step 1231 determines that there is not sufficient time to perform another measurement, then the interrupt flag is set in step 1235, and wireless terminal 115 continues to use the original frequency in step 1233 in order to receive a channel burst from serving base station 103 in step 1205.

If the current candidate frequency BER value is acceptable, at decision block 1223, the wireless terminal 115 resets the interrupt flag and sets the found cell as the new cell at step 1225. Operation returns to step 1203. In an embodiment, the QEF limit corresponds to a BER value of approximately $2 \times 10^{-4}$ after Viterbi decoding in a digital video broadcasting receiver. As can be appreciated by one skilled in the relevant art, an error-correction chain utilized in the digital video broadcasting receiver may include a Viterbi decoder stage and a Reed Solomon decoder stage.

Figure 13:
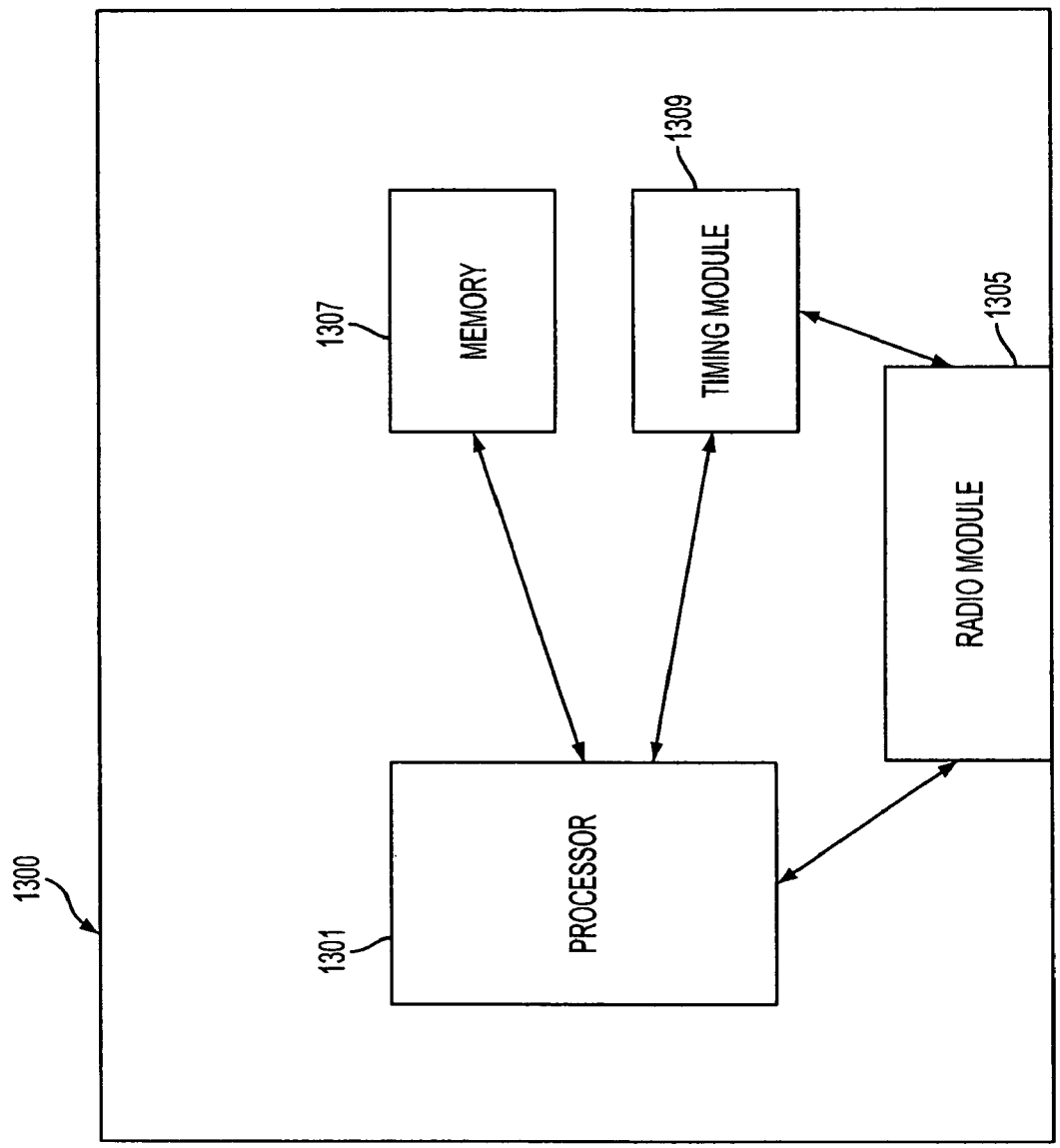
FIG. 13 shows apparatus for a wireless terminal that supports a handover in accordance with an embodiment of the invention.

FIG. 13 shows an apparatus 1300 for wireless terminal 115 that supports phase shifted time slice transmission according to an embodiment of the invention. Apparatus 1300 comprises a processor 1301, a radio module 1305, a memory 1307, and a timing module 1309. Timing module 1309 determines an appropriate time for receiving a channel burst. In the embodiment, timing module 1309 comprises a crystal oscillator and receives information in a preceding channel burst in which incremental time information is provided. Timing module 1309 uses the incremental timing information to determine the time for the next channel burst and notifies processor 1301. (In a variation of the embodiment, radio module 1305 may comprise a GPS receiver, providing time synchronization for timing module 1309.) Apparatus 1300 receives the group of data packets over radio channel 111 through radio module 1305. Processor 1301 processes the data packets and buffers them into memory (buffer storage) 1307 until the group of data packets has been received. Processor 1301 processes the group of data packets in accordance with the associated data service.

Figure 14:
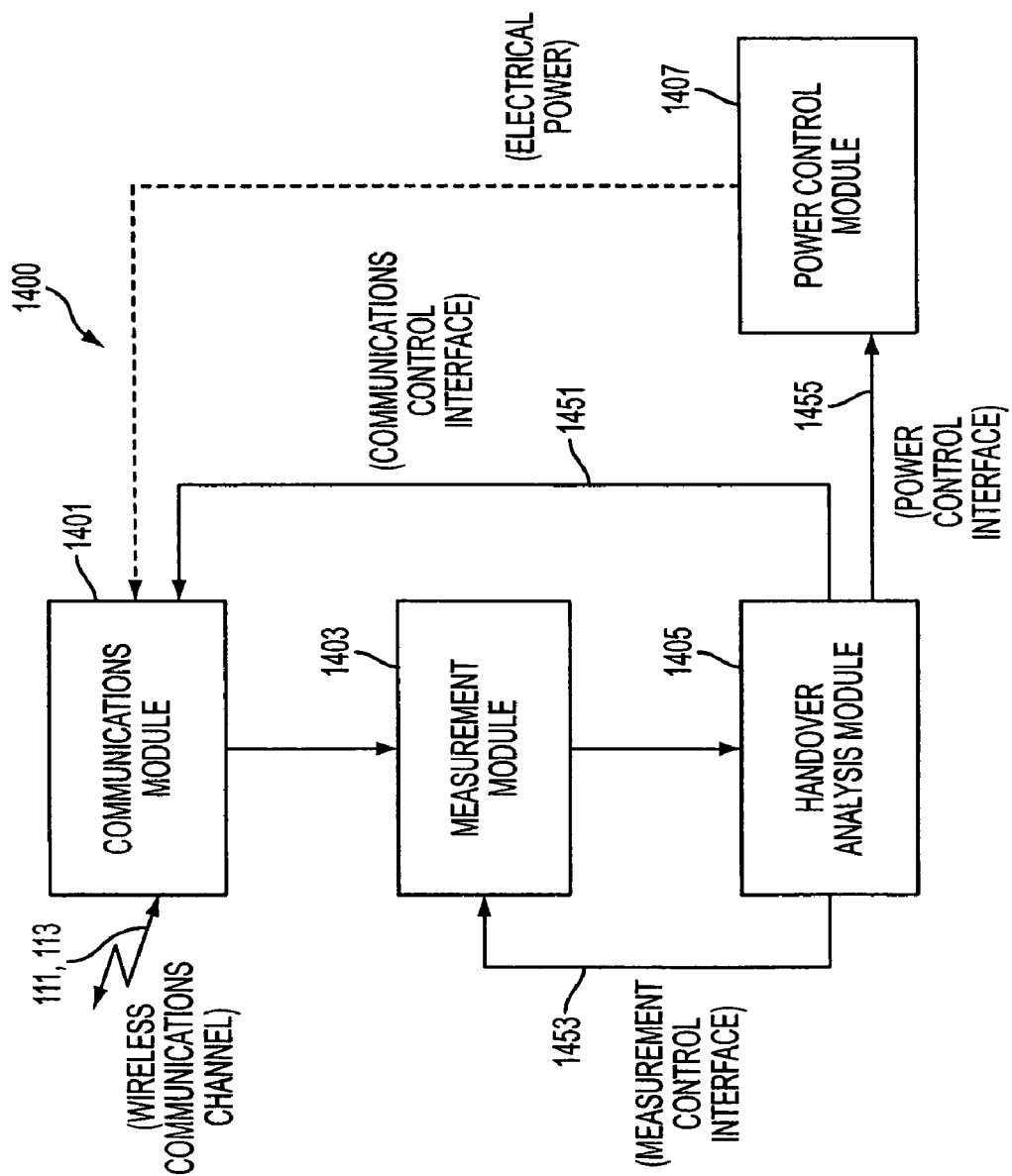
FIG. 14 shows a second apparatus for a wireless terminal that supports a handover in accordance with an embodiment of the invention.

FIG. 14 shows an apparatus 1400 for a wireless terminal 115 that supports a handover in accordance with an embodiment of the invention. Apparatus comprises communications module 1401, measurement module 1403, handover analysis module 1405, and optionally comprises power control module 1407.

Before the handover, wireless terminal 115 receives channel bursts from base station 103 (associated with cell 403) over wireless channel 111, which corresponds to the frequency associated with base station 103, through communications module 1401. Measurement module 1403 provides a measurement of the signal quality for wireless channel 111 to handover analysis module 1405. If the signal quality is sufficiently poor such that a handover criterion is met, handover analysis module instructs, through communications control interface 1451, communications module to tune to wireless channels of candidate cells between channel bursts transmitted by serving base station 103 and instructs, through measurement control interface 1453, measurement module 1405 to measure the associated signal qualities. In the embodiment, handover analysis module maintains a candidate list. If handover analysis module 1405 determines that a handover shall be performed, in accordance with flow diagram 1200, handover analysis module 1405 instructs, through communications control, communications module 1401 to retune to the selected candidate base station on wireless channel 113 after wireless terminal 115 receives the last channel burst from serving base station 103.

If wireless terminal 1400 obtains information about timing (e.g., phase shift offset) of the selected candidate cell, handover analysis module 1405 may suspend reception on wireless channel 113 by instructing communications module 1401 and may further instruct, through power control interface 1455, power control module 1407 to reduce electrical power to communications module 1401 during the time interval between serving base station 103 transmitting the last channel burst and the selected candidate base station transmitting the new channel burst. Moreover, in the embodiment power control module may be instructed by handover analysis module to reduce electrical power to other modules, e.g., measurement module 1403.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   (A) receiving a first channel burst broadcasted from a first base station of a unidirectional broadcast network on a wireless channel, wherein the first base station serves a first cell, wherein the first channel burst supports a data service, and wherein the first channel burst comprises timing information identifying a time period of a subsequent channel burst to be transmitted by the first base station;
   (B) determining whether a serving signal quality associated with the first cell satisfies a handover criterion;
   (C) in response to (B), obtaining measurements associated with a list of candidate cells, wherein the list comprises at least one candidate cell and wherein each measurement gauges a corresponding signal quality that is provided by a corresponding candidate cell, wherein (C) further comprises: if, based on the timing information, the measurements cannot be completed before receiving the subsequent channel burst:
      (i) suspending the obtaining of the measurements;
      (ii) receiving the subsequent channel burst from the first base station; and
      (iii) in response to (ii), resuming the obtaining of the measurements;
   (D) if a selected signal quality is acceptable, deciding to perform a handover to a selected candidate cell, wherein the selected candidate cell is a member of the list and wherein the selected signal quality corresponds to the selected candidate cell;
   (E) after performing (D), receiving a final channel burst from the first base station; and
   (F) in response to (E), performing the handover to the selected candidate cell and receiving a new channel burst from a selected candidate base station of the unidirectional broadcast network such that the handover occurs between the final channel burst and the new channel burst, wherein the selected candidate base station is serving the selected candidate cell.

2. The method of claim 1, wherein (C) comprises:
   setting an interrupt flag if the obtaining of the measurements cannot be completed before receiving the subsequent channel burst from the first base station, and
   resetting the interrupt flag upon reception of the subsequent channel burst.

3. The method of claim 1, wherein the serving signal quality is determined from the first channel burst.

4. The method of claim 1, wherein the serving signal quality is selected from a group of indicators consisting of a received signal strength indicator (RSSI) value, a bit error rate (BER), a packet error rate (PER), and a frame error rate (FER).

5. The method of claim 1, wherein (D) comprises:
   (i) adjusting the selected signal quality by a hysteresis value.

6. The method of claim 1, farther comprising:
   (G) determining the list of candidate cells.

7. The method of claim 6, wherein (G) comprises:
   (i) receiving handover information from the first base station, wherein the handover information comprises candidate information indicative of the list of candidate cells.

8. The method of claim 1, further comprising:
   (G) determining a phase shift offset that is associated with the selected candidate cell.

9. The method of claim 8, wherein (G) comprises:
(i) receiving handover information from the first base station, wherein the handover information comprises the phase shift offset that is associated with the selected candidate cell.

10. The method of claim 8, further comprising:
(H) in response to (E), suspending reception on the wireless channel until performing (F).

11. The method of claim 10, wherein (H) comprises:
(i) instructing a module of a wireless terminal to reduce power consumption.

12. The method of claim 1, further comprising:
(G) if a candidate signal quality is not acceptable, removing the associated candidate from the list of candidate cells.

13. The method of claim 1, wherein (F) comprises:
(i) receiving the new channel burst associated with a different frequency.

14. The method of claim 1, wherein (F) comprises:
(i) receiving the new channel burst associated with a different channelization code.

15. A computer-readable medium having computer-executable instructions that, when executed, cause a processor to perform the method recited in claim 1.

16. A computer-readable medium having computer-executable instructions that, when executed, cause a processor to perform the method recited in claim 10.

17. The method of claim 1, further comprising serving a digital broadband broadcasting area and the data service is associated with a digital broadband broadcasting service.

18. The method of claim 1, further comprising accessing a lookup table to determine a phase shift offset associated with the selected base station.

19. The method of claim 1, farther comprising:
(G) in response to (E), determining that the serving signal quality is not indicative of a handover; and
(H) in response to (G), canceling the handover to the selected candidate cell.

20. An apparatus comprising:
a storage buffer;
a timing module; and
a radio module configured to communicate with a wireless system over a wireless channel;
a processor configured to receive an indication from the timing module that a current first channel burst is being transmitted, wherein the current first channel burst contains a first group of data packets, and configured to store the first group of data packets into the storage buffer, the processor configured to perform:
(A) receiving a first channel burst broadcasted from a first base station of a unidirectional broadcast network on a wireless channel, wherein the first base station serves a first cell and wherein the first channel burst supports a data service, the first channel burst comprising timing information identifying a time period of a subsequent channel burst to be transmitted by first base station;
(B) determining whether a serving signal quality associated with the first cell satisfies a handover criterion;
(C) obtaining measurements associated with a list of candidate cells, wherein the list comprises at least one candidate cell and wherein each measurement gauges a corresponding signal quality that is provided by a corresponding candidate cell, wherein (C) further comprises: if, based on the timing information, the obtaining of the measurements cannot be completed before receiving the subsequent channel burst:
(i) suspending the obtaining of the measurements;
(ii) receiving the subsequent channel burst from the first base station; and
(iii) in response to (ii), resuming the obtaining of the measurements;
(D) if a selected signal quality is acceptable, deciding to perform a handover to a selected candidate cell, wherein the selected candidate cell is a member of the list and wherein the selected signal quality corresponds to the selected candidate cell;
(E) after performing (D), receiving a final channel burst from the first base station; and
(F) in response to (E), performing the handover to the selected candidate cell and receiving a new channel burst from a selected candidate base station of the unidirectional broadcast network such that the handover occurs between the final channel burst and the new channel burst, wherein the selected candidate base station is serving the selected candidate cell.

21. The apparatus of claim 20, wherein the processor is configured to perform:
(G) adjusting the selected signal quality by a hysteresis value.

22. The apparatus of claim 20, wherein the processor is configured to perform:
(G) determining a phase shift offset that is associated with the selected candidate cell.

23. The apparatus of claim 20, wherein the processor is configured to perform:
(G) determining a phase shift offset that is associated with the selected candidate cell;
(H) in response to (E), suspending reception on the wireless channel until performing (F); and
(I) in response to (H), instructing a module of a wireless terminal to reduce power consumption.

24. The apparatus of claim 20, wherein the processor is configured to perform:
(G) if a candidate signal quality is not acceptable, removing the associated candidate from the candidate list.

25. An apparatus comprising:
a communications module configured to receive a plurality of channel bursts broadcasted from a first base station of a unidirectional broadcast network before a handover and a new channel burst from a selected base station and configured to controllably tune to one of a plurality of base stations, wherein the plurality of channel bursts and the new channel burst support a data service on a wireless channel, and wherein at least one of the plurality of channel burst comprises timing information identifying a time period of a subsequent channel burst to be transmitted by the first base station;
a measurement module configured to obtain signal quality information from the communications module, the signal quality information being indicative of the first base station and the selected base station, the selected base station being a member of the plurality of base stations; and
a handover analysis module:
configured to instruct the communications module to tune to said one of the plurality of base stations and to instruct the measurement module to obtain corresponding signal quality information corresponding to said one of the plurality of base station;

configured to process the signal quality information to determine whether handover to the selected base station;

configured to determine if, based on the timing information, the obtaining of the signal quality information cannot be completed before receiving the subsequent channel burst, to instruct the measurement module to suspend the obtaining of the signal quality information to permit the communications module to receive the subsequent channel burst, and to instruct the measurement module to resume the obtaining of the signal quality information in response to the subsequent channel burst being received;

configured to instruct the communications module to receive a last channel burst from the first base station in response to determining to perform the handover; and configured to instruct the communications module to tune to the selected base station of the unidirectional broadcast network and to receive the new channel burst from the selected base station such that the handover occurs between the final channel burst and the new channel burst.

26. The apparatus of claim 25, further comprising:

a power control module configured to reduce electrical power to the communications module if provided an instruction by the handover analysis module, wherein the handover analysis module is configured to generate the instruction between a time interval between the last channel burst and the new channel burst, and wherein the communications module is configured to suspend reception on the wireless channel.

27. A method comprising:

(A) receiving a first channel burst broadcasted from a first base station of a unidirectional broadcast network on a wireless channel, wherein the first base station serves a first cell, wherein the first channel burst supports a multicast service, and wherein the first channel burst comprises timing information identifying a time period of a subsequent channel burst to be transmitted by the first base station;

(B) determining a list of candidate cells, wherein the list comprises at least one candidate cell;

(C) determining whether a serving signal quality associated with the first cell satisfies a handover criterion;

(D) obtaining measurements associated with the list of candidate cells, wherein each measurement gauges a corresponding signal quality that is provided by a corresponding candidate cell, wherein (D) further comprises: if, based on the timing information, the obtaining of the measurements cannot be completed before receiving the subsequent channel burst:
  (i) suspending the obtaining of the measurements;
  (ii) receiving the subsequent channel burst; and
  (iii) in response to (ii), resuming the obtaining of the measurements;

(E) adjusting a selected signal quality by a hysteresis value;

(F) if a candidate signal quality is not acceptable, removing an associated candidate from the candidate list;

(G) if the selected signal quality is acceptable, deciding to perform a handover to a selected candidate cell, wherein the selected candidate cell is a member of the list and wherein the selected signal quality corresponds to the selected candidate cell;

(H) after performing (G), receiving a final channel burst from the first base station; and (I) in response to (H), performing the handover to the selected candidate cell and receiving a new channel burst from a selected candidate base station of the unidirectional broadcast network such that the handover occurs between the final channel burst and the new channel burst, wherein the selected candidate base station is serving the selected candidate cell and wherein the new channel burst supports the multicast service.

* * * * *

UNITED STATES PATENT AND TRADEMARK OFFICE
CERTIFICATE OF CORRECTION

PATENT NO. : 7,660,583 B2  Page 1 of 1
APPLICATION NO. : 10/804263
DATED : March 19, 2004
INVENTOR(S) : Harri Pekonen et al.

It is certified that error appears in the above-identified patent and that said Letters Patent is hereby corrected as shown below:

In Column 12, Line 58, Claim 6:
Please delete "farther" and insert --further--.

In Column 13, Line 36, Claim 19:
Please delete "farther" and insert --further--.

In Column 14, Line 53, Claim 25:
Please delete "burst" and insert --bursts--.

In Column 14, Line 67, Claim 25:
Please delete "station" and insert --stations--.

In Column 15, Line 2, Claim 25:
Please delete "whether" and insert --whether to--.

Signed and Sealed this

Thirteenth Day of July, 2010

David J. Kappos
*Director of the United States Patent and Trademark Office*